UNITED STATES PATENT OFFICE.

WILHELM TRAUBE, OF BERLIN, GERMANY.

PROCESS OF MAKING DIALKYL-BARBITURIC ACIDS.

No. 822,165.  Specification of Letters Patent.  Patented May 29, 1906.

Application filed July 6, 1905. Serial No. 268,529.

*To all whom it may concern:*

Be it known that I, WILHELM TRAUBE, chemist, a citizen of Germany, residing at 14 Maassenstrasse, Berlin, in the Kingdom of Prussia and Empire of Germany, have invented a new Process for Making Dialkyl-Barbituric Acids, of which the following is a specification.

If one molecular weight of diethyl-malonyl chlorid or any other dialkyl-malonyl chlorid is mixed with two to three molecular weights of an etheric salt of carbamic acid and then heated, hydrochloric acid is given off in large quantity and derivates of diethyl-malonic acid or any other dialkyl-malonic acid with the etheric salts are formed. These compounds are thick oils with acidic character. They may be separated from a small residue of precipitated ammonium chlorid by dissolving them in ether or alcohol and then causing the solvent to evaporate after filtration. The oils do not contain any chlorin. According to the results of the analysis the formula $C_{13}H_{22}N_2O_6$ must be assigned to the compound formed from diethyl-malonyl chlorid and ethyl-carbamate. The compound may be named diethyl-malonyl diethyl-carbamate. It will probably be formed from the components in accordance with the following equation:

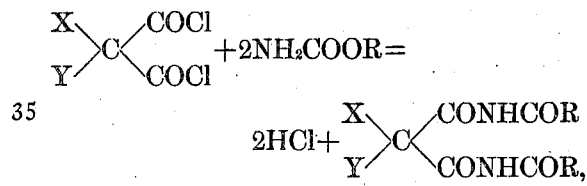

where X, Y, and R represent the alkyl radicals.

The new compound diethyl-malonyl diethyl-carbamate is difficultly soluble in cold water, but easily in ether and alcohol. It is easily dissolved in diluted alkali and regained from this solution by an addition of acids.

If the new compound or its homologues are treated with any condensing agent, such as sodium alcoholate, alcohol is given off. Probably a compound of ring-shaped constitution, a derivate of the carbamic acid, will be formed in accordance with the following equation:

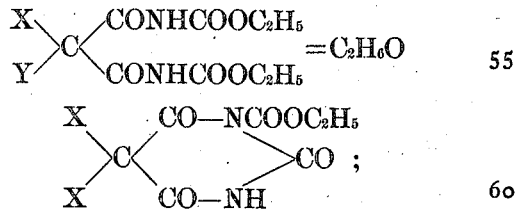

but this compound could not yet be prepared in a free state, as it very easily loses the carboxetyhl group $COOC_2H_5$. So, for instance, if the product of the reaction between diethyl-malonyl diethyl-carbamate and sodium alcoholate is dissolved in water after any alcohol has been evaporated and then acidified by a mineral acid a gas is evolved which will partly consist of carbon dioxid and a compound will crystallize. This compound is diethyl-malonyl urea. If another dialkyl-malonic acid is used, the correspondent homologous dialkyl-malonyl urea will be formed. Instead of sodium alcoholate any other condensing agent may be used in making dialkyl-malonyl urea—such as alcoholic alkâli, alkaline amids, alkaline metals, ammonia, concentrated or fuming sulfuric acid, and the like.

As is well known, diethyl-malonyl urea and its homologues are of importance because of their therapeutic properties.

Example: Twenty parts of diethyl-malonyl chlorid are mixed with eighteen to twenty parts of carbamate. The mixture is heated to 110° to 150° centigrade (230° to 300° Fahrenheit) till the copious evolution of hydrochloric acid slackens. The formed diethyl-malonyl diethyl-carbamate is dissolved in absolute alcohol and separated from small quantities of solid by-products by filtering. Then the alcoholic solution of the derivate of carbamate is added to a solution of 2.3 to 6.9 parts of sodium in absolute alcohol, boiled with it for some hours in a flask with a return-condenser or heated with it in a digester or iron crucible at 100° to 110° centigrade (212° to 230° Fahrenheit) and acidified afterward by a diluted acid. Then the alcohol is distilled over suitably under diminished pressure. The diethyl-barbituric acid or diethyl-malonyl urea precipitates as a crystalline compound.

Having thus particularly described and ascertained the nature of my invention and in what manner the same is to be performed, I declare that what I claim is—

A process for making dialkyl-barbituric acids consisting in heating one molecular weight dialkyl-malonyl chlorid with two to three molecular weights alkyl-carbamates at a suitable temperature until the copious evolution of hydrochloric acid slackens, treating the dialkyl-malonyl dialkyl-carbamates formed thereby with condensing agents, as sodium alcoholate, and isolating the products of the reaction.

In testimony whereof I have hereunto set my hand in presence of two subscribing witnesses.

WILHELM TRAUBE.

Witnesses:
HENRY HASPER,
WOLDEMAR HAUPT.